United States Patent Office 3,714,086
Patented Jan. 30, 1973

3,714,086
COATING COLORS CONTAINING SATIN WHITE WITH GOOD VISCOSITY STABILITY
Horst Schaefer, Frankfurt am Main, and Helmut Neises, Kelkheim, Taunus, Germany, assignors to Farbwerke Hoechst Aktiengesellschaft vormals Meister Lucius & Bruning, Frankfurt am Main, Germany
No Drawing. Filed Mar. 31, 1967, Ser. No. 627,317
Claims priority, application Germany, Apr. 7, 1966, F 48,890
Int. Cl. C08f 45/04
U.S. Cl. 260—17 R    8 Claims

ABSTRACT OF THE DISCLOSURE

Coating colors containing satin white, a liquefier and polyvinvyl alcohol and process for preparing same.

---

The present invention relates to coating colors containing satin white with good viscosity stability.

Satin white is concomitantly used as a pigment in the manufacture of high-quality coated papers (for example copperplate printing) in order to achieve a maximum capacity of the papers for being printed on (K. H. Rosenstock, Tappi, October 1965, pp. 113A through 116A). As binders for coating colors containing satin white there are mainly used casein and plastics dispersions.

It is known that polyvinyl alcohol, as compared to other water-soluble binders, such as starch, casein and cellulose derivatives, has a considerably higher capacity for binding pigments (G. P. Colgan and J. J. Latimer, Tappi, July 1964, pp. 146A through 150A, with index of further literature references). In these publications reference is made to the use of china clay, partly in admixture with titanium dioxide as a pigment and polyvinyl alcohol as a binder, without the mention of satin white as a pigment.

Viscosity stability of the coating colors during the processing period and as high a solid content as possible are essential requirements for coating colors in the manufacture of coated papers. Viscosity-stable coating colors having a high solid content could not be obtained with polyvinyl alcohol up to the present time since the coating colors prepared with the use of dispersing agents from the group of condensed phosphates need plenty of water and are not viscosity-stable during the conventional processing period, but their viscosity increases. For this reason, polyvinyl alcohol was considered to be incompatible with satin white or pigment mixtures containing satin white.

Now we have found that with the use of suitable auxiliaries satin white can be liquefied and coating colors having a good viscosity stability and the necessary solid content obtained with this liquefied satin white, also in combination with other pigments usually employed in the paper industries which contain polyvinyl alcohol as the water-soluble binder, preferably with the simultaneous use of plastics dispersions.

As liquefiers for coating colors containing satin white and polyvinyl alcohol as a binder there may be used according to the present invention anionic substances of the type of the water-soluble salts, for example alkali metal salts, especially sodium or potassium salts, ammonium- or amine salts, of organic poly acids, especially of organic polyacids of high molecular weight. Salts of suitable organic poly acids are, for example, those of high molecular weight polysulfonic acids, polycarboxylic acids, furthermore the salts of gum arabic, alginic acids or cellulose derivatives containing carboxyl groups. From the group of the polysulfonic acids the salts of polyvinyl sulfonic acids have proved to be especially suitable. From the group of the polycarboxylic acids there have to be mentioned especially the salts of polyacrylic acids and those of the carboxy-methyl celluloses. There may be used a single salt as well as a mixture of the said salts.

The coating colors according to the present invention may contain, in addition to satin white as a pigment, also one or several other pigments, for example clay, especially China clay, furthermore blanc fix, calcium carbonate, or titanium dioxide.

The content of polyvinyl alcohol of the coating colors used according to the present invention may vary considerably. By "polyvinyl alcohol" there are to be understood totally or partially saponified polyvinyl esters if the latter are still water-soluble.

Coating colors having especially valuable properties are obtained by using, in addition to polyvinyl alcohol, also at least one aqueous dispersion of a synthetic resin. As suitable aqueous synthetic resin dispersions there are mentioned, for example, those of polymers of a vinyl ester, for example vinyl acetate, of an ester of acrylic acid and/or methacrylic acid, preferably an ester of acrylic acid or methacrylic acid and an aliphatic saturated monohydric alcohol containing 1 to 8 carbon atoms, furthermore of copolymers of the aforementioned monomers and of copolymers of butadiene/styrene and vinyl ester/ethylene especially vinyl acetate/ethylene. The content of aqueous synthetic resin dispersions of the novel coating colors may also vary considerably.

The liquefaction of satin white by the aforementioned auxiliaries can be brought about by incorporating the dry liquefier or the aqueous solution thereof, or by incorporating the liquefier dissolved in a solution of polyvinyl alcohol.

The coating colors containing satin white according to the present invention and having a good viscosity stability generally comprise (1) 1 to 100% satin white
(2) 99 to 0% of a pigment mixture consisting of
   (a) 99 to 0% of China clay
   (b) 99 to 0% of blanc fix
   (c) 99 to 0% of calcium carbonate
   (d) 99 to 0% of titanium dioxide
(3) 1 to 15% of polyvinyl alcohol
(4) 0 to 25% of at least one aqueous dispersion of a synthetic resin (5) 0.1 to 10% of at least one liquefier.

Coating colors with ratios situated within the following range are distinguished by properties of an even higher superiority:

(1) 2 to 50% satin white
(2) 98 to 50% of a pigment mixture consisting of
  (a) 98 to 50% China clay
  (b) 98 to 50% blanc fix
  (c) 98 to 50% of calcium carbonate
  (d) 98 to 50% of titanium dioxide
(3) 1 to 10% of polyvinyl alcohol
(4) 0 to 20% of at least one aqueous dispersion of a synthetic resin
(5) 0.1 to 5% of at least one liquefier.

Properties which were even more favorable were obtained with the use of coating colors containing:

(1) 2 to 30% satin white
(2) 98 to 70% of a pigment mixture composed of
  (a) 98 to 70% of China clay
  (b) 98 to 70% of blanc fix
  (c) 98 to 70% of calcium carbonate
  (d) 98 to 70% of titanium dioxide
(3) 2 to 5% of polyvinyl alcohol
(4) 0 to 15% of at least one aqueous dispersion of a synthetic resin
(5) 1 to 3% of at least one liquefier.

In the aforementioned figures the substances are calculated as dry substances and all percentage figures are calculated on the total weight of satin white and the other pigments.

The following examples serve to illustrate the invention, but they are not intended to limit it thereto, the parts being by weight.

EXAMPLE 1

Satin white is generally prepared in the form of a pasty paste which is incapable of flowing and whose viscosity is practically not measurable, with a solid content within the range of from 20 to 30%.

100 parts, respectively, of such a paste of satin white having a solid content of 25% were liquefied, while stirring, with 10 parts, respectively, of a 10% solution in water of the following products:

It has also been found that it is very essential in which manner the pigment dispersion is mixed with the polyvinyl alcohol solution. If, according to the method indicated above, 7.5 parts polyvinyl alcohol (with a viscosity of the 4% solution in water of about 40 cp., measured according to Hoeppler at 20° C.) in the form of a 10% solution in water were placed in the reaction vessel and the pigment mixture was added while stirring, a satisfactory, practically viscosity-stable coating color could be obtained without the manifestation of thickening phenomena. With the use of this pigment composition, it was possible first to place the pigment mixture in the reaction vessel and then to add the polyvinyl alcohol solution without thickening of the batch occurring when adding the solution, with agitation. As the proportion of satin white in the pigment mixture descreased, the thickening increased when the polyvinyl alcohol solution was stirred into the pigment dispersion that had been placed in the reaction vessel. This thickening phenomenon observed in the preparation of the coating color which, in the case of insufficient shearing forces, corresponded to a partial coagulation of the system, could be avoided by first placing the polyvinyl alcohol solution in the reaction vessel and then adding the pigment dispersion, with agitation.

To avoid in any case suddenly occurring thickening phenomena in the preparation of the coating colors, it is recommendable, on principle, to place the polyvinyl alcohol solution in the reaction vessel and then to add the pigment mixture. When operating in this manner one need not take into consideration the proportion satin white: China clay.

| Liquefier for satin white | Viscosity of the coating colors (cp.) measured at 20° C. (Brookfield RVT; spindle 2; 20 r.p.m.) | |
| --- | --- | --- |
| | Measurement after the preparation of the batch | Measurement 24 hours later |
| Sodium polyvinyl sulfonate (Table Test 1) | 400 | 410 |
| Sodium polyacrylate (Table Test 4) | 930 | 770 |
| Sodium carboxymethyl cellulose (Table Test 7) | 700 | 850 |

| Liquefier (1% calculated on satin white) | Viscosity (cp.) measured at 20° C. (Brookfield RVT; spindle 2; 20 r.p.m.) | | |
| --- | --- | --- | --- |
| | Measurement prior to the liquefaction | Measurement after the liquefaction | Measurement 72 hours after the liquefaction |
| Sodium polyvinyl sulfonate | Not measurable | 20 | 15 |
| Sodium polyacrylate | do | 80 | 80 |
| Sodium carboxymethyl cellulose | do | 170 | 22 |

EXAMPLE 2

Coating colors containing satin white and polyvinyl alcohol were prepared according to the following method:

250 parts satin white (solid content 20%) were liquefied, while stirring, with 2 parts liquefier (as a 10% solution in water), and 50 parts China clay, in the form of a dispersion of about 65% strength in water obtained separately by means of a high speed stirring apparatus, were added, while stirring, to the liquefied satin white that had been placed in the reaction vessel. As wetting agent for the preparation of the dispersion of China clay the liquefier used in each instance was applied in an amount of 0.4 part, calculated on 100 parts China clay. With the use of sodium carboxymethyl cellulose (in a 5% solution in water) as a liquefier, a corresponding amount of a condensed phosphate was used as a wetting agent for China clay.

EXAMPLE 3

With the use of the recipe and the method indicated in Example 2, coating colors were prepared to which were added aqueous plastics dispersions, with agitation. As plastics dispersions there were used dispersions of copolymers of (a) vinyl acetate/acrylic acid butyl ester
(b) butadiene/styrene.

The tests listed in the following table show that with the use of the aforesaid liquefiers or with the mixtures thereof coating colors containing satin white could be prepared with polyvinyl alcohol as a water-soluble binder, which coating colors were practically viscosity-stable even after the addition of plastics dispersions.

TABLE (EXAMPLE 3).—COMPOSITION OF THE COATING COLORS (IN PARTS BY WEIGHT)

| Test | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Substances used: | | | | | | | | | | | | | | | |
| Satin white (parts by wt. calc. on the solid content) | 50 | 50 | 50 | 50 | 50 | 50 | 50 | 50 | 50 | 50 | 50 | 50 | 50 | 50 | 50 |
| Liquefier for satin white: | | | | | | | | | | | | | | | |
| Sodium polyvinyl sulfonate | 2 | 2 | 2 | | | | | | | 1 | 1 | 1 | 0.67 | 0.67 | 0.67 |
| Sodium polyacrylate | | | | 2 | 2 | 2 | | | | 1 | 1 | 1 | 0.67 | 0.67 | 0.67 |
| Sodium carboxymethyl cellulose | | | | | | | 2 | 2 | 2 | | | | 0.67 | 0.67 | 0.67 |
| China clay | 50 | 50 | 50 | 50 | 50 | 50 | 50 | 50 | 50 | 50 | 50 | 50 | 50 | 50 | 50 |
| Wetting agents for china clay: | | | | | | | | | | | | | | | |
| Sodium polyvinyl sulfonate | 0.2 | 0.2 | 0.2 | | | | | | | 0.2 | 0.2 | 0.2 | 0.2 | 0.2 | 0.2 |
| Sodium polyacrylate | | | | 0.2 | 0.2 | 0.2 | | | | | | | | | |
| Condensed phosphate | | | | | | | 0.2 | 0.2 | 0.2 | | | | | | |
| Polyvinyl alcohol [1] | 7.5 | 7.5 | 7.5 | 7.5 | 7.5 | 7.5 | 7.5 | 7.5 | 7.5 | 7.5 | 7.5 | 7.5 | 7.5 | 7.5 | 7.5 |
| Plastics dispersion vinyl acetate-acrylic acid butyl ester (1:1), copolymer (parts by weight calculated on the solid content) | | 7.5 | | | 7.5 | | | 7.5 | | | 7.5 | | | 7.5 | |
| Butadiene/styrene (40:60) copolymer (parts by weight calc. on the solid content) | | | 7.5 | | | 7.5 | | | 7.5 | | | 7.5 | | | 7.5 |
| Viscosity (cp.) (at 20° C.), Brookfield RVT; 20 r.p.m.; spindle 2: | | | | | | | | | | | | | | | |
| After the preparation of the coating color | 400 | 590 | 550 | 930 | 1,380 | 1,095 | 700 | 1,700 | 1,290 | 710 | 740 | 890 | 460 | 830 | 770 |
| Measured 24 hours later | 410 | 1,520 | 550 | 770 | 1,110 | 950 | 850 | [2]11,000 | 1,240 | 660 | 990 | 750 | 570 | 1,000 | 700 |
| Solid content percent | 26.2 | 27.1 | 27.1 | 26.2 | 27.1 | 27.1 | 25.0 | 25.8 | 25.8 | 25.9 | 26.7 | 26.7 | 25.8 | 26.6 | 26.6 |

[1] Approximately 40 cp. of the 4% solution in water, measured according to Hoeppler at 20° C.
[2] Spindle 5.

We claim:

1. Coating colors containing satin white with good viscosity stability comprising 1 to 100% satin white, 99 to 0% of a pigment mixture consisting of (a) 99 to 0% of China clay, (b) 99 to 0% of blanc fix, (c) 99 to 0% of calcium carbonate, (d) 99 to 0% of titanium dioxide, 1 to 15% of polyvinyl alcohol, 0 to 25% of at least one aqueous dispersion of a synthetic resin, said synthetic resin being a member selected from the group consisting of a polymer of a vinyl ester, an ester of acrylic acid or methacrylic acid and an aliphatic saturated monohydric alcohol containing 1 to 8 carbon atoms, of a copolymer of the aforementioned monomers, of a copolymer of butadiene and styrene and of a copolymer of a vinyl ester and ethylene, and 0.1 to 10%, as a liquefier for said satin white a member selected from the group consisting of alkali metal salts, ammonium or amine salts of polyvinyl sulfonic acid, polyacrylic acid or carboxy-methyl cellulose said polyvinyl alcohol resins and liquefiers being calculated as dry substances and all percentage figures being calculated on the total weight of satin white and the other pigments.

2. Coating colors containing satin white with good viscosity stability comprising 2 to 50% satin white, 98 to 50% of a pigment mixture consisting of (a) 98 to 50% China clay, (b) 98 to 50% blanc fix, (c) 98 to 50% of calcium carbonate, (d) 98 to 50% of titanium dioxide, 1 to 10% of polyvinyl alcohol, 0 to 20% of at least one aqueous dispersion of a synthetic resin, said synthetic resin being a member selected from the group consisting of a polymer of a vinyl ester, an ester of acrylic acid or methacrylic acid and an aliphatic saturated monohydric alcohol containing 1 to 8 carbon atoms, of a copolymer of the aforementioned monomers, of a copolymer of butadiene and styrene and of a copolymer of a vinyl ester and ethylene, and 0.1 to 5% as a liquefier for said satin white a member selected from the group consisting of alkali metal salts, ammonium or amine salts of polyvinyl sulfonic acid, polyacrylic acid or carboxy-methyl cellulose said polyvinyl alcohol resins and liquefiers being calculated as dry substances and all percentage figures being calculated on the total weight of satin white and the other pigments.

3. Coating colors containing satin white with good viscosity stability comprising 2 to 30% satin white, 98 to 70% of a pigment mixture composed of (a) 98 to 70% of China clay, (b) 98 to 70% of blanc fix, (c) 98 to 70% of calcium carbonate, (d) 98 to 70% of titanium dioxide, 2 to 5% of polyvinyl alcohol, 0 to 15% of at least one aqueous dispersion of a synthetic resin, said synthetic resin being a member selected from the group consisting of a polymer of a vinyl ester, an ester of acrylic acid or methacrylic acid an an aliphatic saturated monohydric alcohol containing 1 to 8 carbon atoms, of a copolymer of the aforementioned monomers, of a copolymer of butadiene and styrene and of a copolymer of a vinyl ester and ethylene, and 1 to 3% as a liquefier for said satin white a member selected from the group consisting of alkali metal salts, ammonium or amine salts of polyvinyl sulfonic acid, polyacrylic acid or carboxymethyl cellulose; said polyvinyl alcohol, resins and liquefiers being calculated as dry substances and all percentages figures being calculated on the total weight of satin white and the other pigments.

4. In a method for liquefying satin white containing coatings which comprise 1 to 100% satin white, 99 to 0% of a pigment mixture consisting of (a) 99 to 0% of China clay, (b) 99 to 0% of blanc fix, (c) 99 to 0% of calcium carbonate, (d) 99 to 0% of titanium dioxide, 1 to 15% of polyvinyl alcohol, 0 to 25% of at least one aqueous dispersion of a synthetic resin, said synthetic resin being a member selected from the group consisting of a polymer of a vinyl ester, an ester of acrylic acid or methacrylic acid and an aliphatic saturated monohydric alcohol containing 1 to 8 carbon atoms, of a copolymer of the aforementioned monomers, of a copolymer of butadiene and styrene and of a copolymer of a vinyl ester and ethylene, the improvement of which comprises adding to the solution of polyvinyl alcohol or to a pigment dispersion containing satin white, before an aqueous dispersion of said synthetic resin is mixed with a mixture of polyvinyl alcohol and the pigment dispersion, 0.1 to 10%, as a liquefier for said satin white of a member selected from the group consisting of alkali metal salts, ammonium or amine of polyvinyl sulfonic acid, polyacrylic acid or carboxy-methyl cellulose; said polyvinyl alcohol, resins and liquefiers being calculated as dry substances and all percentage figures being calculated on the total weight of satin white and the other pigments.

5. A coating composition for high grade paper comprising as a major amount of a mixture of the alkaline pigment of satin white and non-alkaline pigment selected from the group consisting of clay and titanium dioxide, and a minor amount of polyvinyl alcohol as a pigment binder, said mixture of pigments and pigment binder being provided with a minor amount sufficient to provide a coating of substantially reduced viscosity of a dispersant selected from the group consisting of (A) sodium carboxymethyl cellulose and (B) sodium polyacrylate.

6. The coating composition of claim 5, wherein the dispersant is sodium carboxymethyl cellulose.

7. The coating composition of claim 5, wherein the disperant is sodium polyacrylate.

8. The coating composition of claim 5, wherein the amount of dispersant is about 0.1 to 10% by weight of the total amount of alkaline and non-alkaline pigment.

References Cited

UNITED STATES PATENTS

| | | | |
|---|---|---|---|
| 2,998,400 | 8/1961 | French | 260—29.6 W A |
| 3,026,281 | 3/1962 | Harren et al. | 260—29.6 R W |
| 3,228,785 | 1/1966 | Growald et al. | 260—29.6 R U X |
| 3,247,006 | 4/1966 | Hoge et al. | 260—29.6 W A X |
| 2,281,267 | 10/1966 | Rice | 260—29.6 R U X |
| 3,245,816 | 4/1966 | Schwalbe | 106—213 |
| 3,477,970 | 11/1969 | Beeman | 260—17 |
| 3,068,111 | 12/1962 | Seymour | 260—29.6 X |
| 3,324,063 | 6/1967 | Teot | 260—29.6 |
| 3,501,424 | 3/1970 | Imoto et al. | 260—17 |

SAMUEL H. BLECH, Primary Examiner

U.S. Cl. X.R.

106—308 Q, C, M; 117—155 UA; 260— 27 R, RV, BB, 29.6 RW, WA, B, 29.7 WA, 41 B